(12) United States Patent
Cui et al.

(10) Patent No.: US 11,916,458 B2
(45) Date of Patent: Feb. 27, 2024

(54) LINEAR VIBRATION MOTOR WITH SOLENOID ASSEMBLY AROUND MAGNETS

(71) Applicant: AAC Microtech (Changzhou) Co., Ltd., Changzhou (CN)

(72) Inventors: Zhiyong Cui, Shenzhen (CN); Yao Wang, Shenzhen (CN); Lubin Mao, Shenzhen (CN); Yun Tang, Shenzhen (CN); Jie Ma, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 177 days.

(21) Appl. No.: 17/566,613

(22) Filed: Dec. 30, 2021

(65) Prior Publication Data
US 2022/0311319 A1   Sep. 29, 2022

(30) Foreign Application Priority Data
Mar. 26, 2021 (CN) .......................... 202120625100.9

(51) Int. Cl.
*H02K 33/00* (2006.01)
*H02K 33/18* (2006.01)

(52) U.S. Cl.
CPC .................................. *H02K 33/18* (2013.01)

(58) Field of Classification Search
CPC ........ H02K 35/00; H02K 35/02; H02K 35/04; H02K 35/06; H02K 33/00; H02K 33/02; H02K 33/10; H02K 33/16; H02K 13/18
USPC ............. 310/14, 15–29, 81, 80, 321, 28–30, 310/36–37, 40 MM
See application file for complete search history.

(56) References Cited

U.S. PATENT DOCUMENTS

| | | | | |
|---|---|---|---|---|
| 7,671,493 B2* | 3/2010 | Takashima | ............. | G06F 3/016 310/15 |
| 8,278,786 B2* | 10/2012 | Woo | ...................... | H02K 33/16 310/15 |
| 8,648,502 B2* | 2/2014 | Park | ...................... | H02K 33/16 310/15 |
| 8,941,272 B2* | 1/2015 | Hong | ..................... | H02K 33/18 310/15 |
| 9,024,489 B2* | 5/2015 | Akanuma | .............. | H02K 33/16 310/15 |
| 9,225,265 B2* | 12/2015 | Oh | ........................ | G06F 3/016 |
| 9,306,429 B2* | 4/2016 | Akanuma | .............. | H02K 33/16 |
| 9,543,816 B2* | 1/2017 | Nakamura | ............. | H02K 33/00 |
| 9,748,827 B2* | 8/2017 | Dong | .................... | H02K 33/16 |
| 9,948,170 B2* | 4/2018 | Jun | ........................ | H02K 33/00 |
| 10,008,894 B2* | 6/2018 | Mao | ........................ | H02K 1/34 |
| 10,033,257 B2* | 7/2018 | Zhang | .................... | H02K 33/12 |
| 10,038,360 B2* | 7/2018 | Wang | .................... | H02K 33/12 |

(Continued)

*Primary Examiner* — Maged M Almawri
(74) *Attorney, Agent, or Firm* — W&G Law Group (57) ABSTRACT

One of the objects of the present disclosure is to provide a linear vibration motor which improves the rigidity of the whole system and ensures enhanced stability. The present disclosure provides a linear vibration motor having a housing body; a stator including at least two solenoid assemblies with parallel axes; a vibrator installed in the housing body; and an elastic connector suspending the vibrator in the housing body. The vibrator includes a first magnet assembly being located between two adjacent at least two solenoid assemblies and including a first magnet and a second magnet. Magnetization directions of the first magnet and the second magnet are opposite and parallel to an axial direction of the solenoid assembly.

6 Claims, 8 Drawing Sheets

(56) References Cited

U.S. PATENT DOCUMENTS

| | | | | |
|---|---|---|---|---|
| 10,063,128 B2* | 8/2018 | Wang | | H02K 33/16 |
| 10,160,010 B2* | 12/2018 | Chun | | H02K 33/16 |
| 10,307,791 B2* | 6/2019 | Xu | | B06B 1/045 |
| 10,328,461 B2* | 6/2019 | Xu | | B06B 1/045 |
| 10,483,451 B2* | 11/2019 | Wang | | H10N 30/85 |
| 10,486,196 B2* | 11/2019 | Chai | | B06B 1/045 |
| 10,491,090 B2* | 11/2019 | Zu | | H02K 33/16 |
| 10,596,596 B2* | 3/2020 | Ling | | B06B 1/045 |
| 10,674,278 B2* | 6/2020 | Zhou | | H04R 9/025 |
| 10,763,732 B2* | 9/2020 | Liu | | H02K 33/18 |
| 10,886,827 B2* | 1/2021 | Liu | | H02K 33/14 |
| 11,050,334 B2* | 6/2021 | Mori | | H02K 33/18 |
| 11,309,808 B1* | 4/2022 | Li | | H02K 35/02 |
| 2006/0028072 A1* | 2/2006 | Iwasa | | H02K 33/00 |
| | | | | 310/12.25 |
| 2009/0267423 A1* | 10/2009 | Kajiwara | | H02K 33/02 |
| | | | | 310/38 |
| 2010/0102646 A1* | 4/2010 | Masami | | H02K 33/16 |
| | | | | 310/29 |
| 2010/0117607 A1* | 5/2010 | Mochida | | H02K 7/1876 |
| | | | | 322/99 |
| 2010/0213773 A1* | 8/2010 | Dong | | H02K 33/16 |
| | | | | 310/25 |
| 2011/0018364 A1* | 1/2011 | Kim | | H02K 33/18 |
| | | | | 310/20 |
| 2011/0068640 A1* | 3/2011 | Choi | | H02K 5/04 |
| | | | | 310/25 |
| 2011/0089772 A1* | 4/2011 | Dong | | H02K 33/16 |
| | | | | 310/25 |
| 2011/0115311 A1* | 5/2011 | Dong | | H02K 33/16 |
| | | | | 310/28 |
| 2011/0133577 A1* | 6/2011 | Lee | | H02K 33/18 |
| | | | | 310/15 |
| 2012/0153748 A1* | 6/2012 | Wauke | | H02K 33/16 |
| | | | | 310/25 |
| 2012/0187780 A1* | 7/2012 | Bang | | H02K 33/16 |
| | | | | 310/25 |
| 2012/0313459 A1* | 12/2012 | Zhang | | H02K 33/18 |
| | | | | 310/25 |
| 2013/0099600 A1* | 4/2013 | Park | | B06B 1/045 |
| | | | | 310/15 |
| 2013/0285479 A1* | 10/2013 | Kinoshita | | H02K 35/02 |
| | | | | 310/12.12 |
| 2016/0173990 A1* | 6/2016 | Park | | H04R 9/043 |
| | | | | 381/354 |
| 2017/0012515 A1* | 1/2017 | Xu | | H02K 33/02 |
| 2017/0033657 A1* | 2/2017 | Mao | | H02K 33/16 |
| 2017/0033664 A1* | 2/2017 | Xu | | H02K 33/18 |
| 2017/0110920 A1* | 4/2017 | Mao | | H02K 1/34 |
| 2017/0110947 A1* | 4/2017 | Mao | | H02K 5/04 |
| 2017/0288519 A1* | 10/2017 | Kim | | H02K 33/16 |
| 2018/0021812 A1* | 1/2018 | Akanuma | | H02K 33/00 |
| | | | | 310/25 |
| 2018/0056329 A1* | 3/2018 | Akanuma | | H02K 33/16 |
| 2018/0166961 A1* | 6/2018 | Guo | | H02K 33/18 |
| 2018/0166965 A1* | 6/2018 | Mao | | H02K 33/16 |
| 2019/0356208 A1* | 11/2019 | Okayasu | | B06B 1/045 |
| 2020/0044537 A1* | 2/2020 | Huang | | H02K 33/16 |
| 2020/0044544 A1* | 2/2020 | Tang | | H02K 33/16 |
| 2020/0212775 A1* | 7/2020 | Tang | | H02K 33/16 |
| 2020/0212776 A1* | 7/2020 | Ling | | H02K 33/16 |

* cited by examiner

LINEAR VIBRATION MOTOR WITH SOLENOID ASSEMBLY AROUND MAGNETS

FIELD OF THE PRESENT DISCLOSURE

The present disclosure relates to motors, in particular to a linear vibration motor for providing tactile feedback.

DESCRIPTION OF RELATED ART

The solenoid magnetic circuit of the prior art linear vibration motor is usually composed of a solenoid and a magnet array, and the solenoid is provided with a magnet at the end. The voice coil of a single solenoid has a large number of turns, and the iron core easily reaches magnetic saturation when the current is large, and the driving force of the magnetic circuit is small. The magnet located at the end of the solenoid produces a larger static suction force. Using this structure will reduce the overall rigidity of the system and affect the stability of the system.

Therefore, it is necessary to provide an improved linear vibration motor.

SUMMARY OF THE PRESENT DISCLOSURE

One of the objects of the present disclosure is to provide a linear vibration motor which improves the rigidity of the whole system and ensures enhanced stability.

To achieve the above-mentioned objects, the present disclosure provides a linear vibration motor having a housing body; a stator including at least two solenoid assemblies with parallel axes, electrifying in a same direction; a vibrator installed in the housing body; and an elastic connector suspending the vibrator in the housing body. The vibrator includes a first magnet assembly being located between two adjacent at least two solenoid assemblies and including a first magnet and a second magnet arranged in a row. Magnetization directions of the first magnet and the second magnet are opposite and parallel to an axial direction of the solenoid assembly.

In addition, the first magnet and the second magnet are connected by a first yoke.

In addition, an amount of the solenoid assemblies is two; an amount of the first magnet assembly is one and the first magnet assembly is arranged between the two solenoid assemblies.

In addition, the vibrator further includes a second magnet assembly and a third magnet assembly arranged in parallel with the first magnet assembly; the second magnet assembly includes a third magnet and a fourth magnet arranged in a row; magnetization directions of the third magnet and the fourth magnet are opposite and parallel to the axis direction of the solenoid assembly; a opposite magnetic pole polarity of the third magnet and the fourth magnet is opposite to the opposite magnetic pole polarity of the first magnet and the second magnet; the structure of the third magnet assembly is the same as the second magnet assembly; the second magnet assembly and the third magnet assembly are respectively arranged on two outer sides of the two solenoid assemblies.

In addition, the vibrator further includes a weight connecting to an end of the first magnet assembly by a second yoke.

In addition, each of two ends of the first magnet assembly is provided with one weight.

In addition, the elastic connector is an elastic piece with one end fixedly connected to the weight and the other end fixedly connected with an inner wall of the housing body.

In addition, the elastic piece has a V-shaped structure.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby is only to explain the disclosure, not intended to limit the disclosure.

Figure 1:
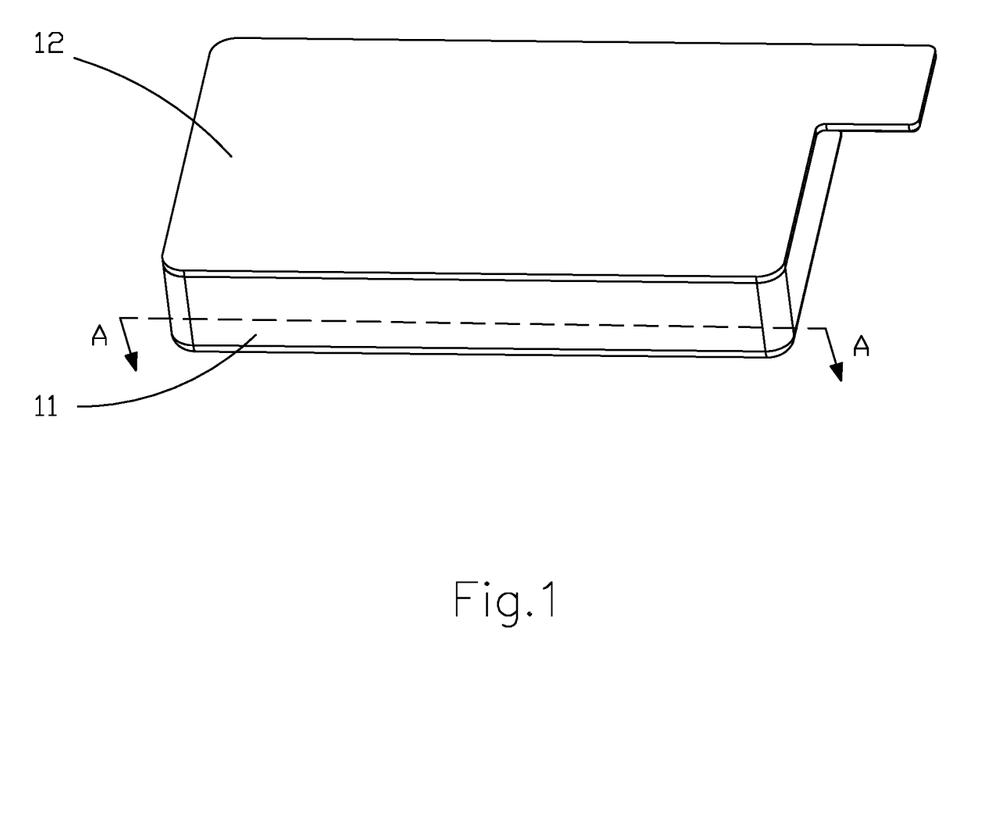
FIG. 1 is an isometric view of a linear vibration motor in accordance with an exemplary embodiment of the present disclosure.
Figure 2:
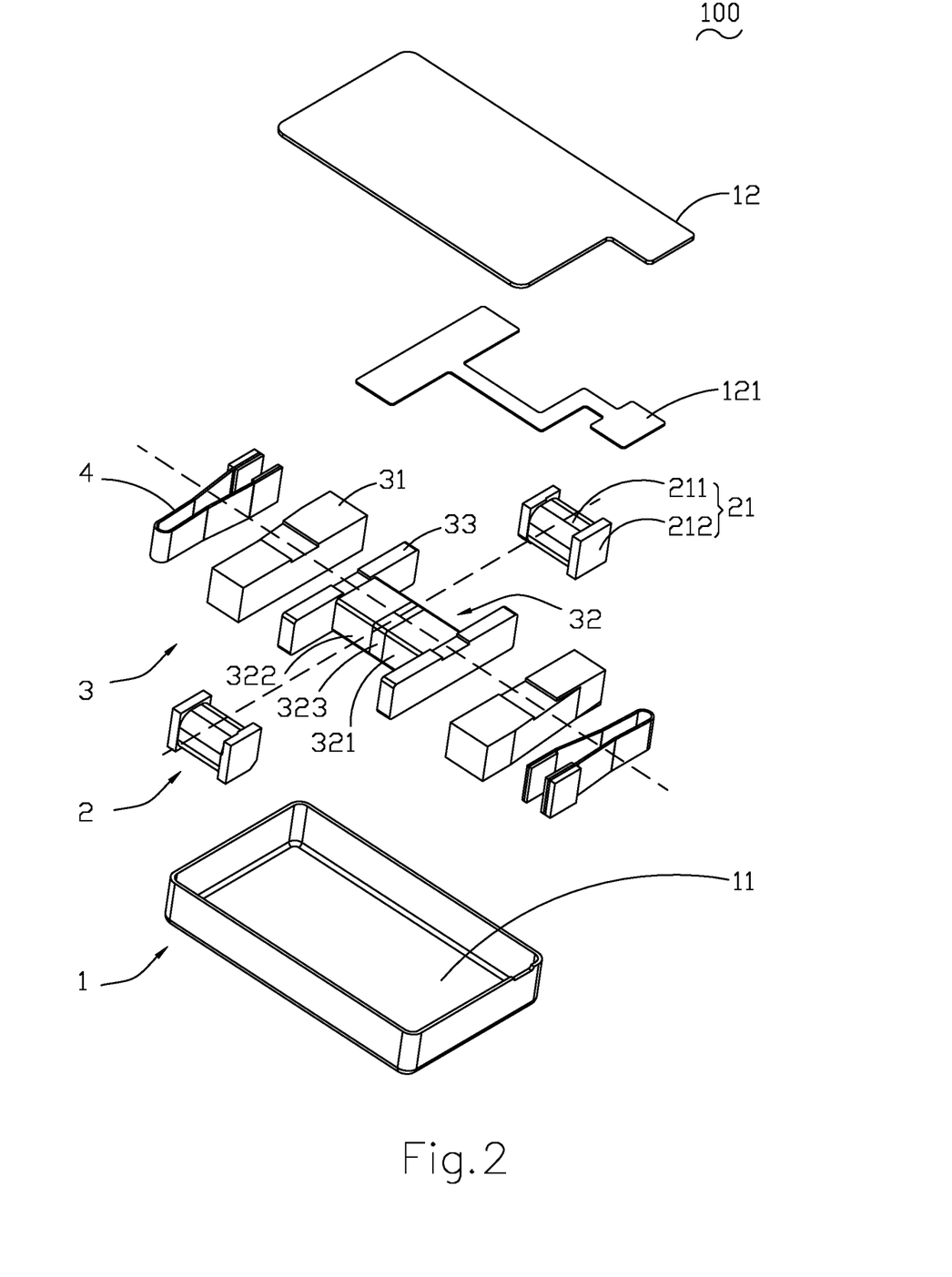
FIG. 2 is exploded view of the vibration motor in FIG. 1.
Figure 3:
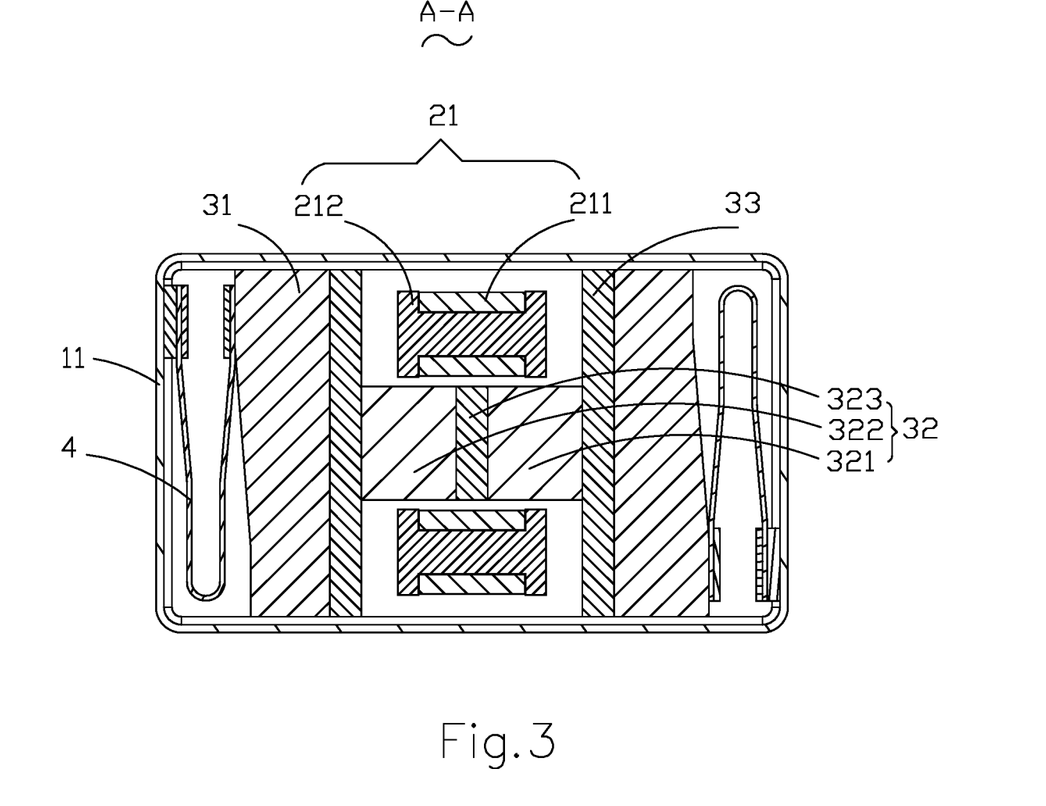
FIG. 3 is a cross-sectional view of the linear vibration motor taken along line AA in FIG. 1.

As shown in FIGS. 1-3, a linear vibration motor 100 of one exemplary embodiment, includes a housing body 1, and a stator 2, a vibrator 3, and an elastic connector 4 installed in the housing body 1. The housing body 1 includes a housing 11 and a cover plate 12. The cover plate 12 is provided with a flexible circuit board 121 that is electrically connected to the stator 2. The cover plate 12 is buckled with the housing 11 to form a closed cavity. The stator 2, the vibrator 3 and the elastic connector 4 are arranged in the cavity. The stator 2 is fixedly installed on the inner wall of the housing 11.

The stator 2 includes at least two solenoid assemblies 21 with parallel axes and spaced apart. The solenoid assembly 21 is composed of voice coil 211 and iron core 212. The solenoid assembly 21 is fixedly installed on the inner wall of the housing 11. When the cover plate 12 is closed, the voice coil 211 and the flexible circuit board 121 are electrically connected. The current direction of voice coil 211 matches the magnetic field arrangement of the system. There is enough space between adjacent solenoid assemblies 21 to facilitate the installation of some components of the vibrator 3.

The vibrator 3 includes a first magnet assembly 32 arranged between adjacent solenoid assemblies 21. The axis of the first magnet assembly 32 and the solenoid assembly 21 are parallel. The first magnet assembly 32 is arranged on the side of the solenoid assembly 21. The first magnet assembly 32 includes a first magnet 321 and a second magnet 322 arranged in a row. The first magnet 321 and second magnet 322 of this embodiment are connected through the first yoke 323. In this embodiment, the first magnet 321 and the second magnet 322 are bonded to the first yoke 323 by glue.

The arrangement of the magnetic field follows the principle of forming a closed magnetic circuit. The magnetizing directions of the first magnet 321 and the second magnet 322 are opposite and parallel to the axial direction of the solenoid assembly 21. The first magnet 321 and the second magnet 322 are arranged opposite to each other in the same pole. The solenoid assembly 21 is energized in the same direction.

The number of solenoid assembly 21 settings can be adjusted according to actual needs. The account of solenoid assemblies 21 for this embodiment is two. The number of first magnet assembly 32 is one. The first magnet assembly 32 is arranged between the two solenoid 21 assemblies.

The vibrator 3 also includes a weight 31, and the end of the first magnet assembly 32 is fixedly connected with the weight 31 to form an integral structure. The first magnet assembly 32 of this embodiment is provided with a weight 31 at each end. There is no correlation between the two weight 31. The end of the first magnet assembly 32 and the weight 31 of this embodiment are connected by a second yoke 33. The second yoke 33 is installed on the weight 31. The first magnet assembly 32 can be directly adhered to the surface of the second yoke 33 by glue. The vibrator 3 composed of the first magnet assembly 32, second yoke 33 and the weight 31 moves as a whole under the action of driving force.

The elastic connector 4 of this embodiment is an elastic piece, and the elastic piece 4 is a V-shaped structure. One end of elastic piece 4 is fixedly connected with the weight 31. The other end of elastic piece 4 is fixedly connected with the inner wall of the housing body 1. The connection between the elastic piece 4 and the weight 31, and the connection between the elastic piece 4 and the inner wall of the housing body 1 are on the same side. The elastic connector 4 suspends the vibrator 3 in the housing body 1. Vibrator 3 moves relative to housing body 1 under the action of driving force.

Figure 4:
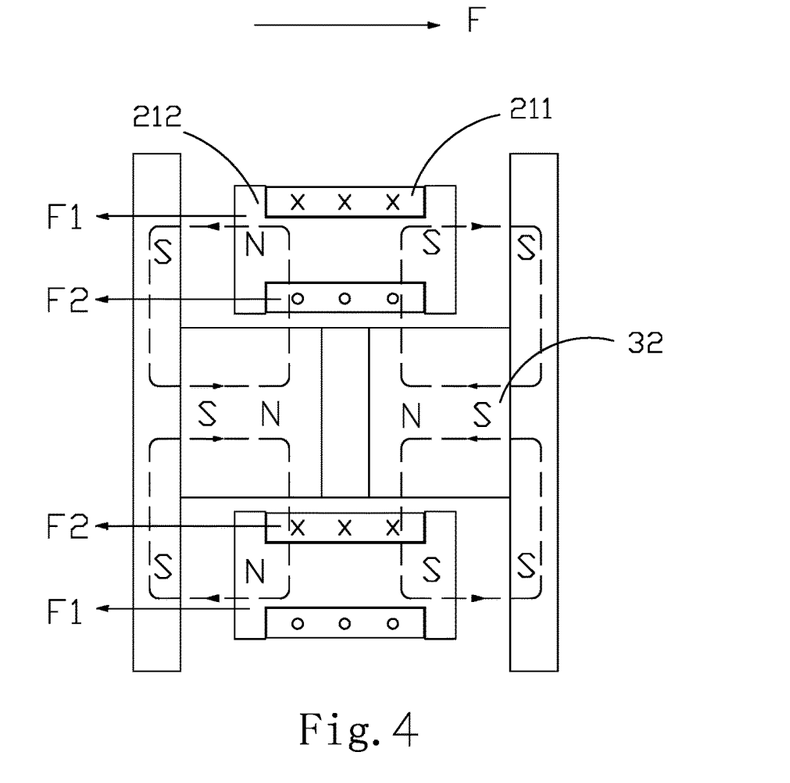
FIG. 4 illustrates a magnetic circuit of the linear vibration motor shown in FIG. 1.
Figure 5:
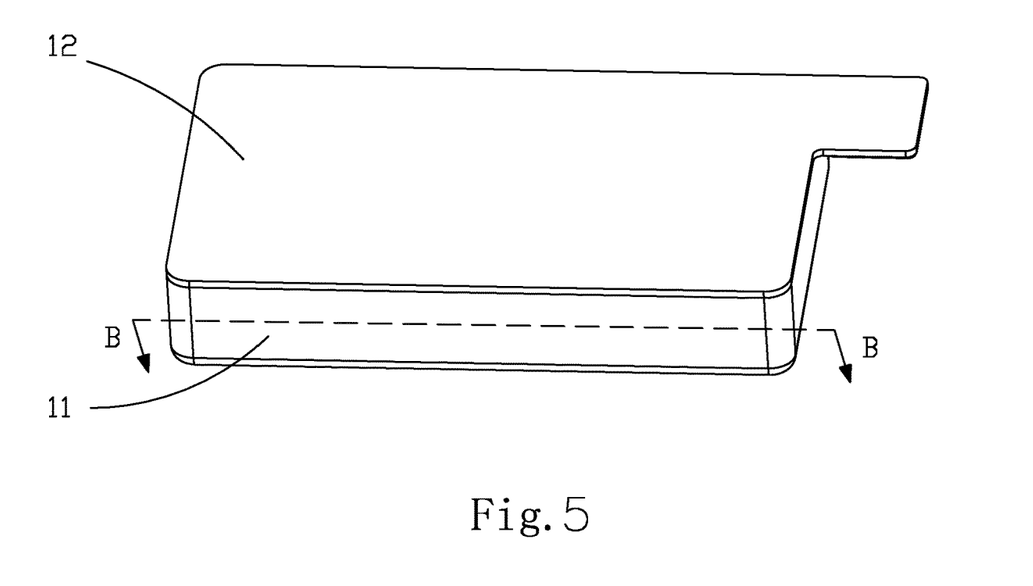
FIG. 5 is an isometric view of a linear vibration motor in accordance with another exemplary embodiment of the present disclosure.
Figure 6:
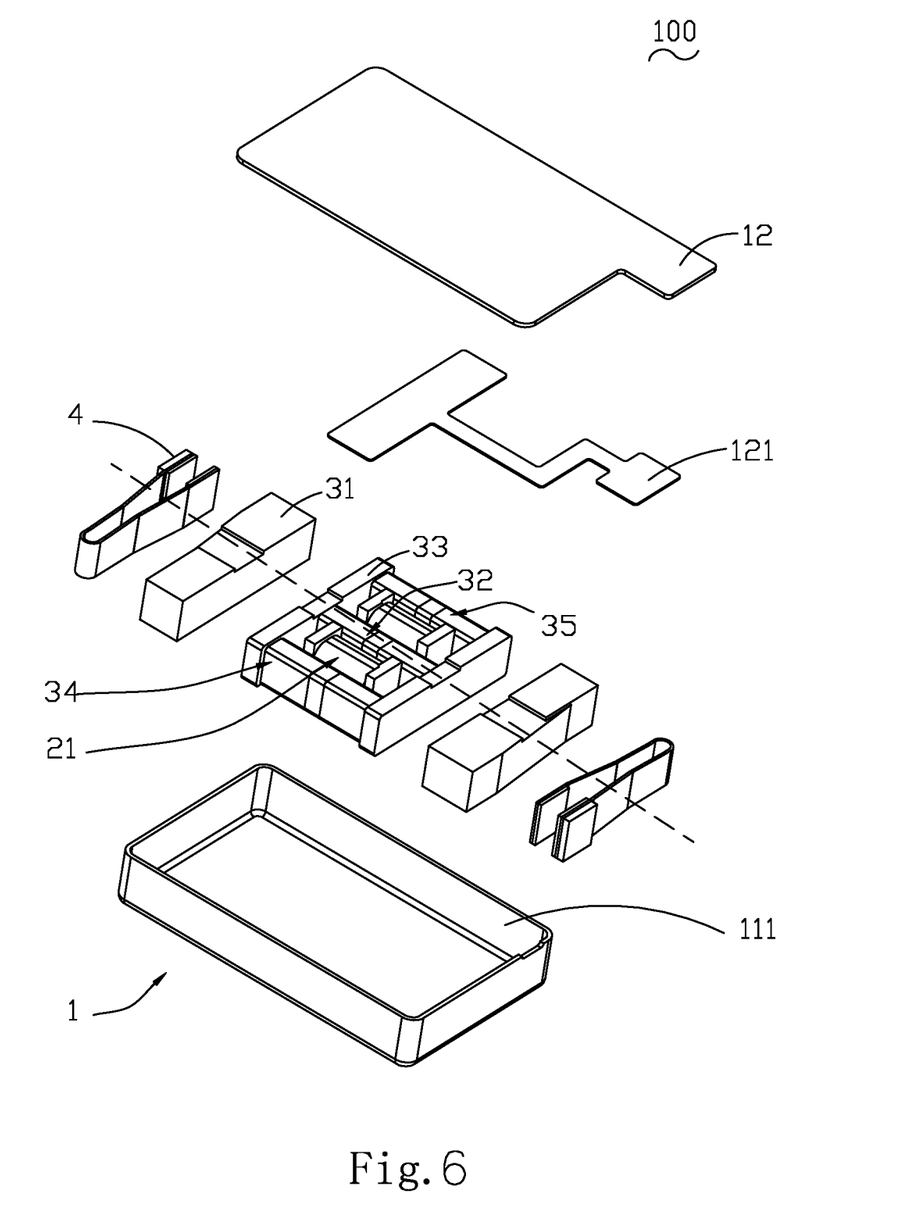
FIG. 6 is an exploded view of the linear vibration motor in FIG. 5.
Figure 7:
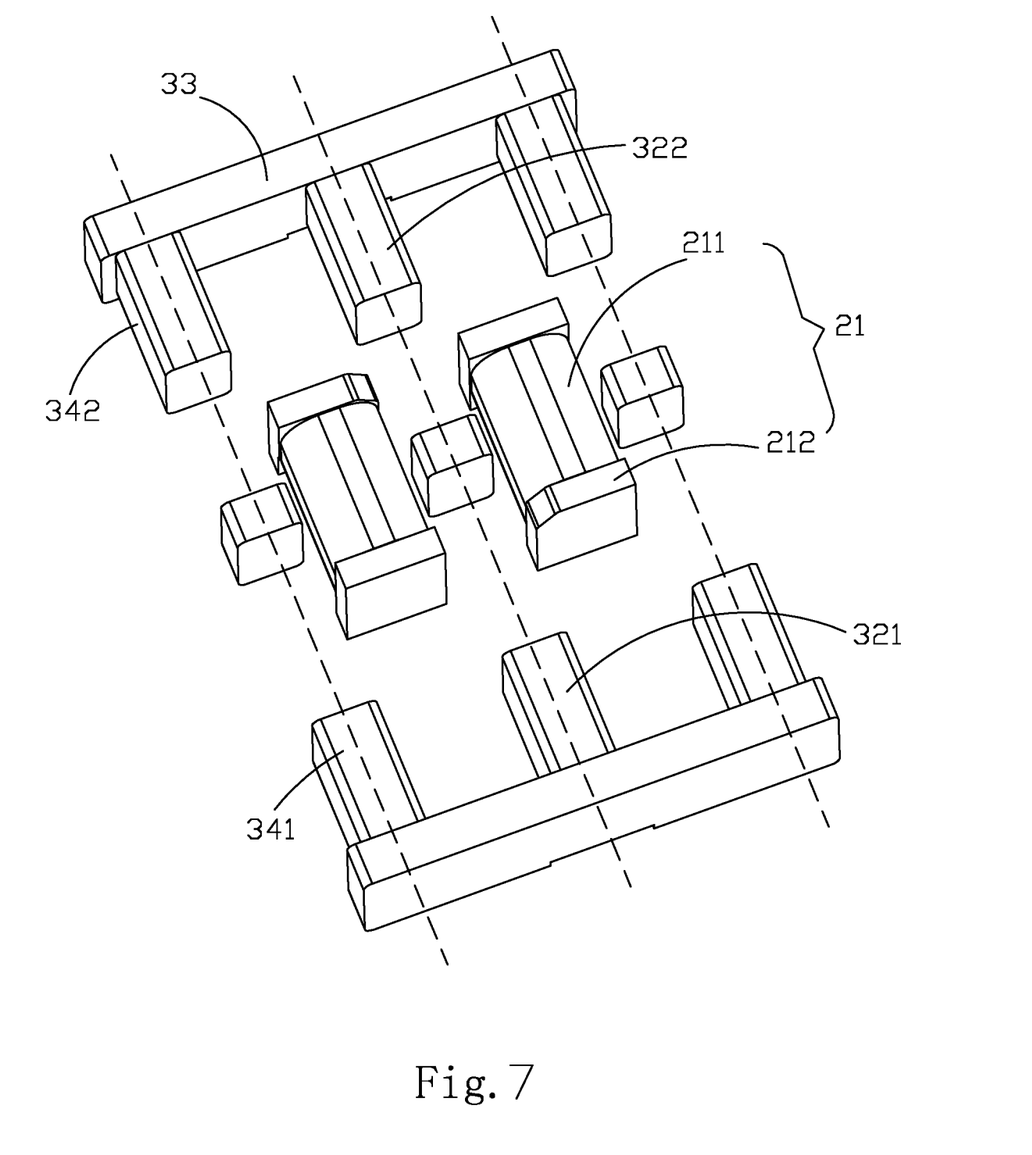
FIG. 7 illustrates an assembly of a stator and a vibrator of the linear vibration motor in FIG. 5.
Figure 8:
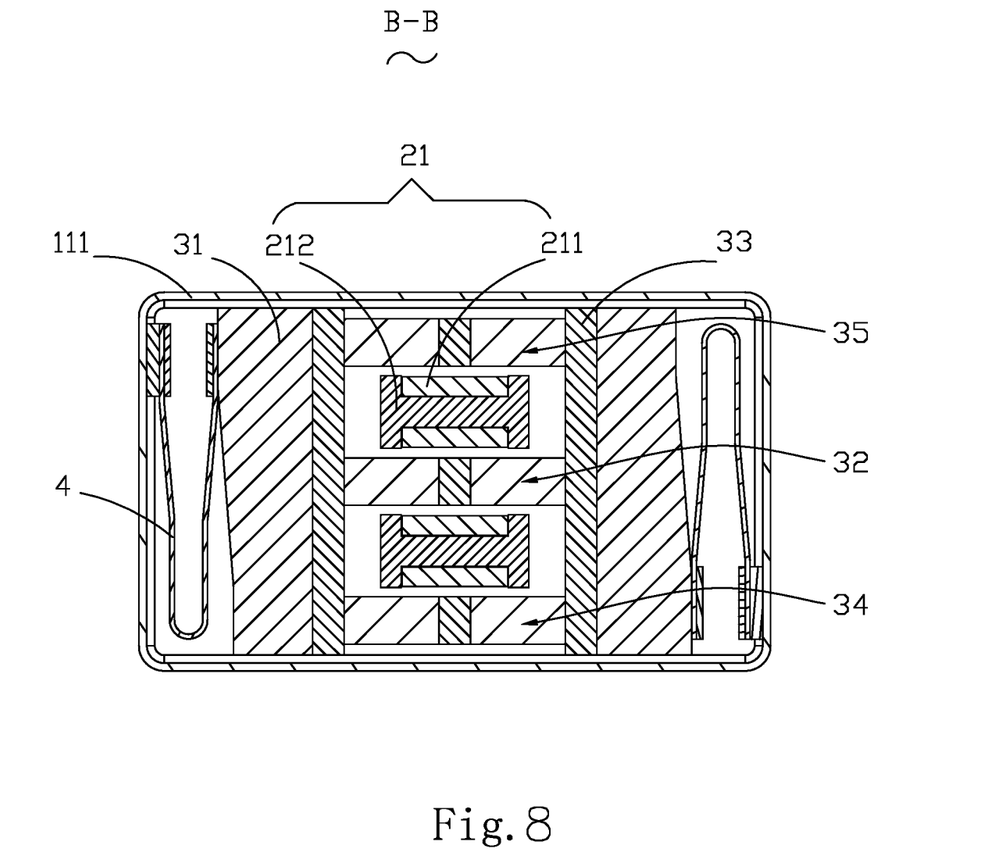
FIG. 8 is a cross-sectional view of the linear vibration motor taken along line BB in FIG. 5.
Figure 9:
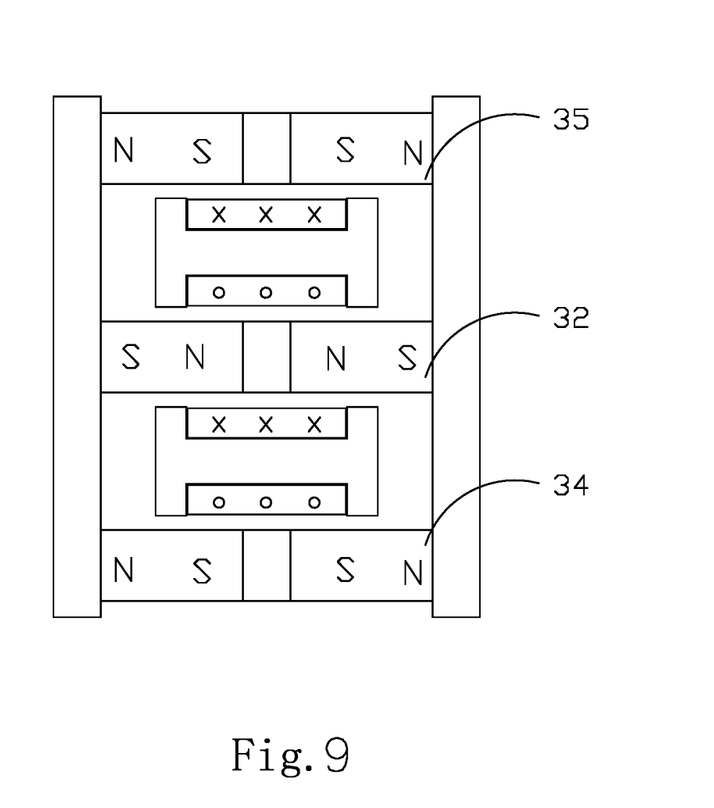
FIG. 9 illustrates an arrangement of magnetic poles of the linear vibration motor.

The magnetic circuit structure of this embodiment is shown in FIG. 4, and the driving principle of the magnetic circuit is as follows:

1. When the voice coil 211 is energized as shown in FIG. 4, the sides of the voice coil 211 on both sides of the first magnet assembly 32 are subjected to ampere force F2 in the left direction;
2. The two solenoid assemblies will generate a magnetic field inside the solenoid assembly under the action of the current as shown in FIG. 4. Thus, the inner iron core 212 is polarized, and the polarized polarity of the iron core 212 is shown in FIG. 4. Under the action of an external magnetic field, the state is subjected to an electromagnetic force F1 directed to the left.
3. Under the action of the above two forces, the vibrator receives a driving force F in the right direction. Similarly, when a reverse current is applied, the driving force will be reversed.

The embodiment through the combination of the solenoid assembly 21 and the first magnet assembly 32 increases the driving force of the magnetic circuit, reduces the magnetic saturation of the iron core 212, and improves the flatness of the driving force.

In order to make better use of the magnetic field and increase the driving force, as shown in FIGS. 5-9, a linear vibration motor 100 of another exemplary embodiment, includes a second magnet assembly 34 and a third magnet assembly 35 arranged in parallel with the first magnet assembly 32. The structure of the second magnet assembly 34 is the same as that of the first magnet assembly 32.

The second magnet assembly 34 includes a third magnet 341 and a fourth magnet 342 arranged in a row. The magnetization directions of the third magnet 341 and the fourth magnet 342 are opposite and parallel to the axis direction of the solenoid assembly 21. The third magnet 341 and the fourth magnet 342 are arranged opposite to each other in the same pole. The relative pole polarities of the third magnet 341 and the fourth magnet 342 are opposite to the relative pole polarities of the first magnet 321 and the second magnet 322. For example, the relative pole polarities of the first magnet 321 and the second magnet 322 are N poles, and the relative pole polarities of the third magnet 341 and the fourth magnet 342 are S poles.

The structure of the third magnet assembly 35 is the same as that of the second magnet assembly 34. The second magnet assembly 35 and the third magnet assembly 34 are respectively arranged on two opposite outer sides of the two solenoid assemblies 21. Compared with embodiment 1, embodiment 2 has the same connection structure and the same magnetic circuit drive principle except for the addition of the second magnet assembly 34 and the third magnet assembly 35.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A linear vibration motor, comprising:
a housing body;
a stator comprising at least two solenoid assemblies with parallel axes, electrifying in a same direction;
a vibrator installed in the housing body, comprising a first magnet assembly being located between two adjacent at least two solenoid assemblies and comprising a first magnet and a second magnet arranged in a row;
an elastic connector suspending the vibrator in the housing body; wherein
magnetization directions of the first magnet and the second magnet are opposite and parallel to an axial direction of the solenoid assembly, an amount of the solenoid assemblies is two; an amount of the first magnet assembly is one and the first magnet assembly is arranged between the two solenoid assemblies, the vibrator further includes a second magnet assembly and a third magnet assembly arranged in parallel with the first magnet assembly; the second magnet assembly includes a third magnet and a fourth magnet arranged in a row; magnetization directions of the third magnet and the fourth magnet are opposite and parallel to the axis direction of the solenoid assembly; a opposite magnetic pole polarity of the third magnet and the fourth magnet is opposite to a opposite magnetic pole polarity of the first magnet and the second magnet the structure of the third magnet assembly is the same as the second magnet assembly; the second magnet assembly and the third magnet assembly are respectively arranged on two outer sides of the two solenoid assemblies.

2. The linear vibration motor as described in claim 1, wherein the first magnet and the second magnet are connected by a first yoke.

3. The linear vibration motor as described in claim 1, wherein the vibrator further includes a weight connecting to an end of the first magnet assembly by a second yoke.

4. The linear vibration motor as described in claim 3, wherein each of two ends of the first magnet assembly is provided with one weight.

5. The linear vibration motor as described in claim 3, wherein the elastic connector is an elastic piece with one end fixedly connected to the weight and the other end fixedly connected with an inner wall of the housing body.

6. The linear vibration motor as described in claim 5, wherein the elastic piece has a V-shaped structure.

* * * * *